US006844970B2

(12) United States Patent
Olczak (10) Patent No.: US 6,844,970 B2
(45) Date of Patent: Jan. 18, 2005

(54) PROJECTION TELEVISION SET, SCREENS, AND METHOD

(75) Inventor: Eugene George Olczak, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 599 days.

(21) Appl. No.: 09/681,591

(22) Filed: May 3, 2001

(65) Prior Publication Data

US 2002/0163599 A1 Nov. 7, 2002

(51) Int. Cl.[7] ............................................. G03B 21/56
(52) U.S. Cl. ...................................................... 359/460
(58) Field of Search ................................ 359/454, 455, 359/456, 457, 460; 348/781, 832, 833

(56) References Cited

U.S. PATENT DOCUMENTS

| 4,083,626 | A | * | 4/1978 | Miyahara et al. ........... 359/460 |
| 4,566,756 | A | | 1/1986 | Heijnemans ................ 359/453 |
| 5,066,099 | A | | 11/1991 | Yoshida et al. ............. 359/457 |
| 5,541,039 | A | | 7/1996 | McFarland et al. ......... 430/290 |
| 5,699,131 | A | | 12/1997 | Aoki et al. ................. 348/832 |
| 5,739,931 | A | | 4/1998 | Zimmerman et al. ....... 359/619 |
| 5,742,358 | A | | 4/1998 | Iijima et al. ............... 348/789 |
| 5,760,955 | A | | 6/1998 | Goldenberg et al. ........ 359/456 |
| 5,844,715 | A | | 12/1998 | Park et al. ................... 359/455 |
| 5,889,612 | A | | 3/1999 | Van De Ven ............... 359/453 |
| 5,999,281 | A | | 12/1999 | Abbott et al. ................ 359/15 |
| 6,151,163 | A | | 11/2000 | Hall, Jr. et al. ............. 359/457 |
| 6,400,504 | B2 | * | 6/2002 | Miyata ....................... 359/457 |
| 6,417,966 | B1 | * | 7/2002 | Moshrefzadeh et al. .... 359/460 |
| 6,466,368 | B1 | * | 10/2002 | Piepel et al. ................ 359/456 |
| 6,519,087 | B2 | * | 2/2003 | Moshrefzadeh ............. 359/453 |

OTHER PUBLICATIONS

D. W. Fox, Kirk–Othmer, "*Plant–Growth Substances to Potassium Compounds*", Encyclopedia of Chemical Technology, Third Edition, vol. 18, pp. 478–494.

* cited by examiner

Primary Examiner—Christopher Mahoney
(74) Attorney, Agent, or Firm—Andrew J. Caruso; Patrick K. Patnode (57) ABSTRACT

RD 29133-17-A method for facilitating a reduction of speckle in a screen receiving light from a light source includes positioning at least one optical path distributing screen element such that the light originating from the light source passes through the screen element and emerges decorrelated from the screen element toward an audience space. The method further includes positioning an angular distribution element between the screen element and the audience space such that the angular distribution element distributes the decorrelated light from the screen element toward the audience space.

62 Claims, 11 Drawing Sheets

Fig. 14

PROJECTION TELEVISION SET, SCREENS, AND METHOD

BACKGROUND OF INVENTION

This invention relates generally to projection television screens, and, more particularly, to projection television screens for use with a coherent projection beam.

Rear projection screens transmit an image projected onto the rear of the screen to an audience space and accordingly are sometimes referred to as transmission screens. Rear projection screens typically include a system to diffuse light transmitted into the audience space. One such system includes a plurality of minute colloidal particles. However, when screens with minute colloidal particles are used with high magnification systems in which the projection beam is coherent, a disturbing artifact in the form of a speckle pattern is often observed. Typically, this speckle pattern is more pronounced in screens with high resolution.

Speckle reduction techniques include reducing a coherence of an illumination beam to facilitate a reduction in the visibility of speckle. One way to reduce the coherence is to move one diffusing screen with respect to another diffusing screen to separate the diffusing surfaces as described in S. Lowenthal et al., J. Opt. Soc. Am., pp. 847–851 (1971); N. George et al., Opt. Commun., pp. 71–71 (1975); E. G. Rawson et al., J. Opt. Soc. Am., pp. 1290–1294 (1976) and L. G. Shirley et al., J. Opt. Soc. Am. A, pp 765–781 (1989). Another known way to facilitate a reduction in speckle utilizes a rear phase grating surface as described in U.S. Pat. Nos. 5,760,955 and 6,147,801.

SUMMARY OF INVENTION

In one embodiment, a method for facilitating a reduction of speckle in a screen receiving light from a light source includes positioning at least one optical path distributing screen element such that the light originating from the light source passes through the screen element and emerges decorrelated from the screen element toward an audience space. The method further includes positioning an angular distribution element between the screen element and the audience space such that the angular distribution element distributes the decorrelated light from the screen element toward the audience space.

In yet another embodiment, a rear projection television includes a housing, a light engine positioned in the housing, and a screen positioned between the light engine and an audience space. The screen is mounted to the housing and includes at least one optical path distributing screen element and at least one angular distribution element operationally coupled to the optical path distributing screen element. The angular distribution element distributes decorrelated light emerging from the screen element toward the audience space.

DETAILED DESCRIPTION

Figure 1:
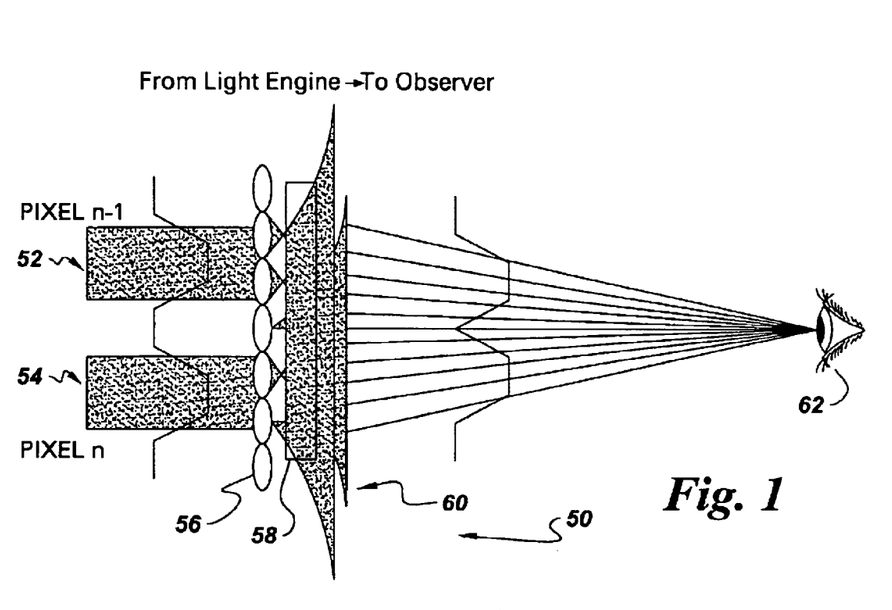
FIG. 1 is an illustration of one embodiment of a speckle reducing projection system.

FIG. 1 is an illustration of one embodiment of a speckle reducing projection system 50 including a first pixel 52 and a second pixel 54. Light enters pixels 52 and 54 from a light engine (not shown in FIG. 1) and exits pixels 52 and 54 entering an optical path distributing element (OPDE) 56. The light is locally inverted by OPDE 56 and exits OPDE 56 to an angular distribution element 58 that forms a screen surface 60. In one embodiment, angular distribution element 58 is a conventional diffuser. The light leaves angular distribution element 58 to an observer 62 in an audience space.

An optical path distribution (OPD) of the light across a diameter of OPDE 56 increases as a focal length of OPDE 56 decreases and, by selecting an appropriate focal length, speckle is reduced when the OPD inside a spatial coherence zone of the light is greater than a coherence length of the light. In one embodiment, OPDE 56 is a non-imaging optical screen element, such as, for example, a non-imaging microlens, and angular distribution element 58 is positioned between non-imaging optical screen element 56 and the audience space such that angular distribution element 58 in combination with screen element 56 decorrelates the light and distributes the decorrelated light toward the audience space, facilitating a reduction in speckle. In another embodiment, OPDE 56 is an imaging element, such as, for example, an imaging microlens, and angular distribution element 58 has a diffusion angle approximately equal to an exit angle of screen element 56, which facilitates a reduction in speckle.

Figure 2:
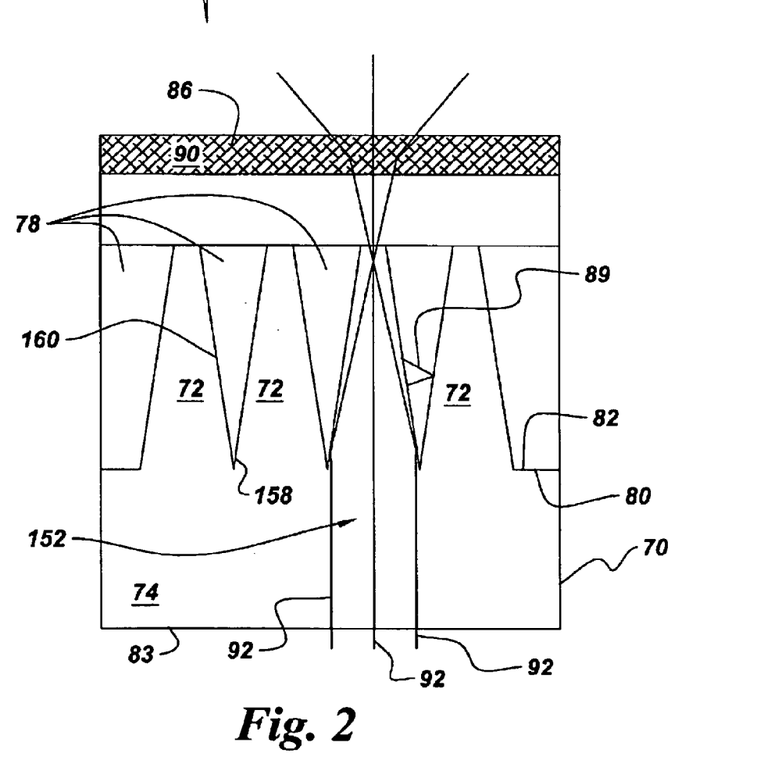
FIG. 2 is a cut away side view of one embodiment of a reduced speckle screen.

FIG. 2 is a cut away side view of one embodiment of a reduced speckle screen 70 including a plurality of OPDEs 72 extending from a substrate 74 to a top section 76. In another embodiment, screen 70 does not include top section 76. In one embodiment, OPDEs 72, substrate 74, and top section 76 are fabricated from an optical conductor with an index of refraction between about 1.1 and about 3. OPDEs 72 can be total internal reflection (TIR) concentrators wherein a TIR index delta n is between about 0.02 and 1. In an exemplary embodiment, non-imaging optical concentrators 72, substrate 74, and top section 76 are fabricated from a polycarbonate having an index of refraction of about 1.59. In another embodiment, OPDEs 72, substrate 74, and top section 76 are fabricated from a polycarbonate having an index of refraction greater than or less than 1.59. Additionally, OPDEs 72, substrate 74, and top section 76 can all have different indices of refraction.

In one embodiment, OPDEs 72, substrate 74, and top section 76 are fabricated from a transparent solid material having an index of refraction equal to or greater than 1.1. In an exemplary embodiment, the transparent solid material has a refractive index between about 1.40 and about 1.65 and is selected from the group of polymethylmethacrylate (PMMA), polycarbonate, polyester, poly(4-methyl pentene), polystyrene and polymers formed by photopolymerization of acrylate monomer mixtures. In another embodiment, OPDEs 72, substrate 74 and top section 76 are fabricated from various transparent solid materials selected from the group of PMMA, polycarbonate, polyester, poly(4-methyl pentene), polystyrene and polymers formed by photopolymerization of acrylate monomer mixtures. In yet another embodiment, OPDEs 72, substrate 74, and top section 76 are fabricated entirely from a PMMA. In an alternate embodiment, at least one of OPDEs 72, substrate 74, and top section 76 are fabricated from a non-solid material such as a gas, a liquid, and a gel.

In an exemplary embodiment, OPDEs 72 are non-imaging optical concentrators and hereinafter are referred to as concentrators 72. A polymer fill material having an index of refraction less than or equal to the index of refraction of concentrators 72 is utilized to fill a plurality of valleys 78 interposed between concentrators 72. The polymer material can include an absorbing dye and is selected from the group of polymethylmethacrylate (PMMA), polycarbonate, polyester, poly(4-methyl pentene), polystyrene and polymers formed by photopolymerization of acrylate monomer mixtures. Additionally, the polymer material can be a mixture including at least two of the group of PMMA, polycarbonate, polyester, poly(4-methyl pentene), polystyrene and polymers formed by photopolymerization of acrylate monomer mixtures. Each valley 78 includes a reflective coating 80 and a light absorbing coating 82. In one embodiment, reflective coating 80 is a mirror fabricated from a metal such as aluminum. Ambient light 84 is absorbed by absorbing layer 82 facilitating a high contrast picture emanating from an audience side 86 of screen 70. In another embodiment, reflective coating 82 is a TIR coating utilizing a low index dielectric with a high index dielectric and a dye such that reflective coating 80 forms a bulk absorber. In an alternative embodiment, valleys 78 do not include reflective coating 80 or light absorbing coating 82. Screen 70 further includes a light engine side 88, and an angular distributing element 90 on audience side 86. Both light engine side 88 and audience side 86 are planar surfaces.

During operation of screen 70, light 92 from a light engine (not shown in FIG. 2) enters screen 70 at light engine side 88 and passes through substrate 74 before entering concentrator 72. When light 92 leaves concentrator 72 there is an accumulated optical path difference between an on-axis path and an off-axis path of light 92. Thus the light traveling along these paths is decorrelated. However since the light paths are projecting toward a plurality of different viewer locations in an audience space (shown in FIG. 1) there is no perception of speckle reduction to a viewer in the audience space when angular distributing element 90 is not included in a screen. However screen 70 includes angular distributing element 90 which distributes the decorrelated light such that at each viewer location light is received from multiple paths through concentrator 72. Accordingly, the combination of angular distributing element 90 and concentrator 72 reduces speckle. More specifically, angular distributing element 90 causes an OPD inside a spatial coherence zone of light 92 that is greater than a coherence length of light 92 facilitating a reduction of speckle. In an alternative embodiment, screen 70 includes a plurality of vertically extending lenticulars arranged horizontally such that light 92 traverses the lenticulars before passing through angular distributing element 90. The lenticulars and angular distributing element 90 are selected such that an OPD inside a spatial coherence zone of light 92 is greater than a coherence length of light 92, which facilitates a reduction of speckle. In one embodiment, angular distributing element 90 is a conventional diffuser.

Figure 3:
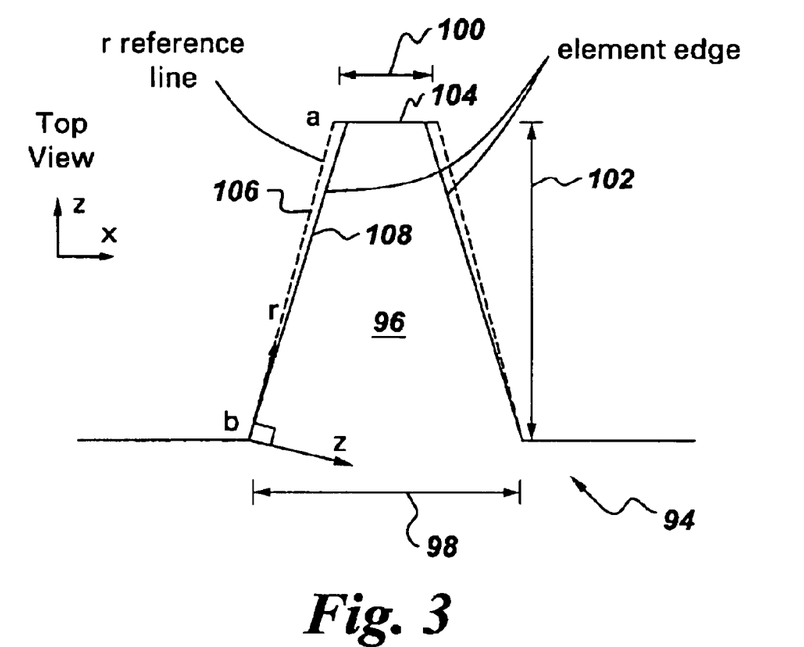
FIG. 3 is a cross-sectional view of a side 94 of an N-sided polygonal non-imaging concentrator element.

FIG. 3 is a cross-sectional view of a facet 94 of an N-sided polygonal non-imaging concentrator element 96 wherein N is between 2 and 12. In an exemplary embodiment, non-imaging concentrator 96 is concentrator 72 (shown in FIG. 2). Facet 94 includes a light incidence width 98, a light emergence width 100, and a height 102. Width 98 is between 20 um and 5 mm. Width 100 is between 20 um and 5 mm. Height 102 is also between 20 um and 5 mm. A point "b" defines one side of width 98 and a point "a" is co-linear with a top end 104 of concentrator 76 and distanced from top end 104. Points a and b are on the same side of element 96. Let r be the distance along a line 106 from point b to point a such that, at point b, r is equal to zero. Let z be the distance (perpendicular) from r along line 106 that characterizes the shape of an edge 108 of non imaging element 96. Then edge 108 is such that $z=cr^2/(1+\sqrt{1-(1+k)c^2r^2})+dr^2+er^4+fr^6$, where $-20<c<20$, $-10<d<10$, $-10<e<10$, $-10<f<10$, and $-10<k<10$, where r and z are given in units of microns. In another embodiment, element 96 is a microlens and z is an optical axis of the microlens according to the above equation. In a further embodiment element 96 is a lenticular element and z represents the optical axis of the lenticular element according the above equation.

Figure 7:
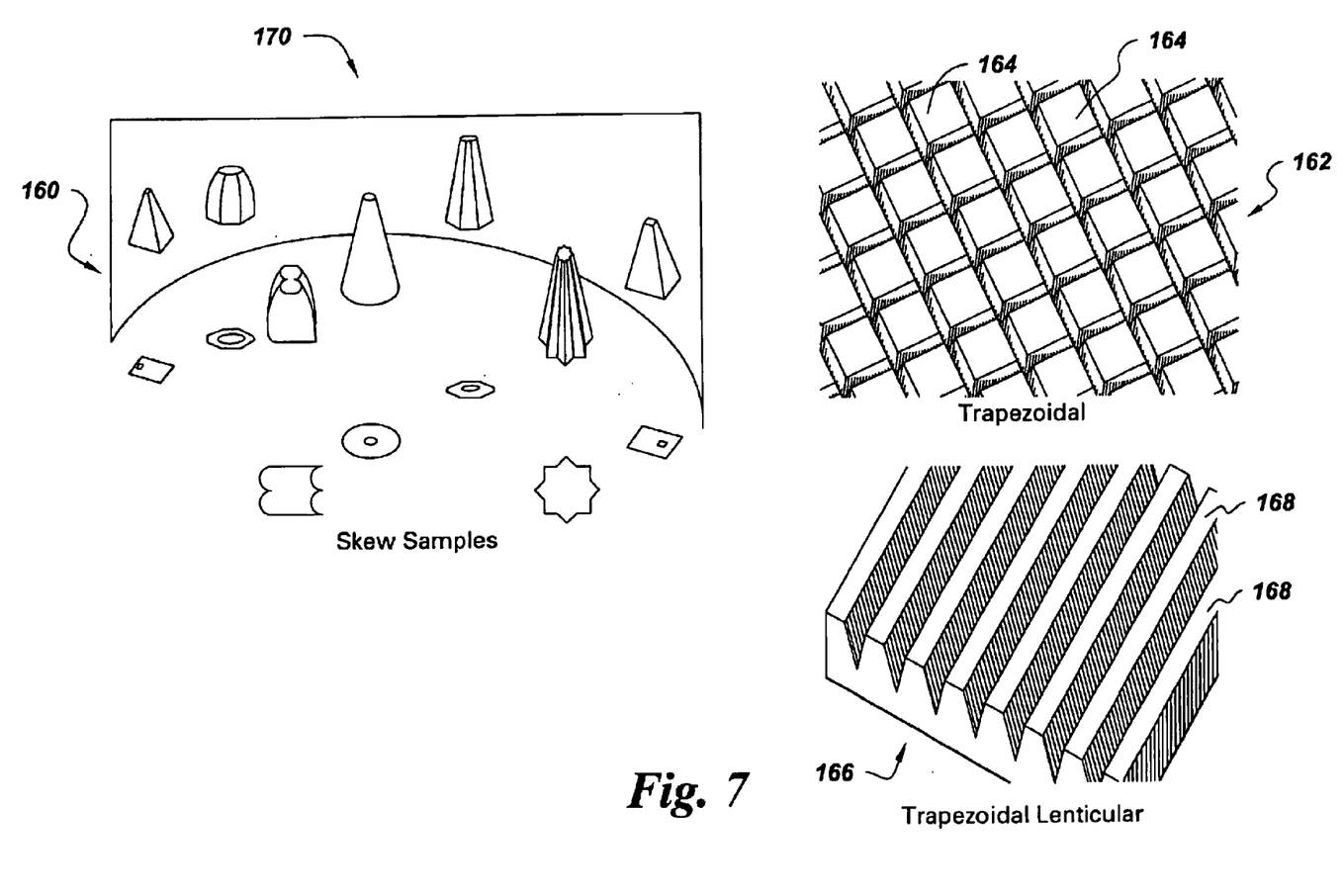
FIG. 7 is a perspective view of a plurality of non-imaging elements.

In an alternative embodiment, element 96 is a gradient index (GRIN) lens and z represents an optical axis wherein the index of refraction (n) is according to $n^2(z)=n+cr^2+dr^4+er^6$, where c is between 0.001 and 10, d is between 0 and 10, and e is between 0 and 10. In further alternative embodiments, element 96 includes elliptical cross sections and/or tapers between polygonal cross-sections and elliptical cross-sections as shown in FIG. 7 regarding skew elements. When element 96 includes elliptical cross-sections, then a major axis of the elliptical cross-section is between 20 um and 5 mm, and a minor axis of the elliptical cross-section is between 20 um and 5 mm.

Figure 4:
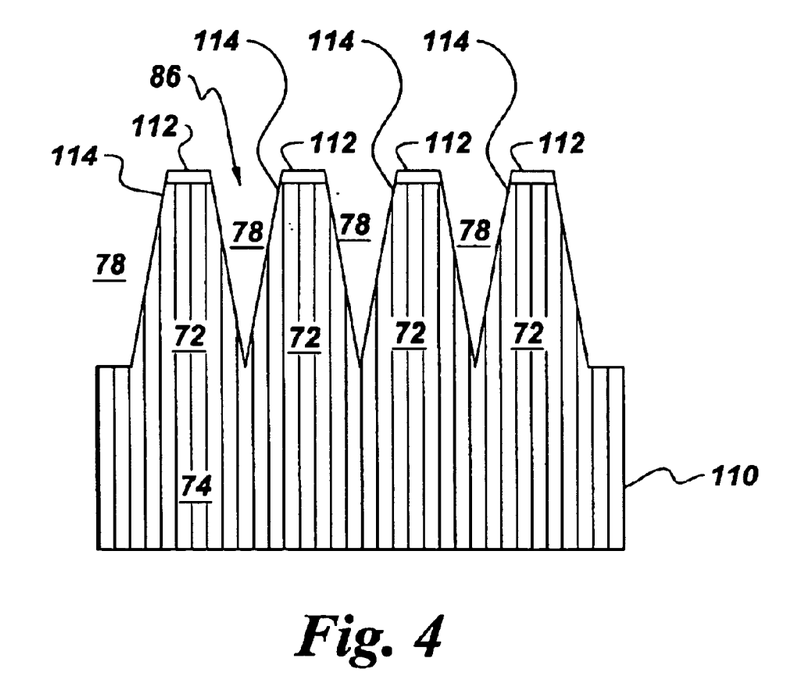
FIG. 4 is a cut away side view of an alternative embodiment of a reduced speckle screen.

FIG. 4 is a cut away side view of an alternative embodiment of a reduced speckle screen 110. Reduced speckle screen 110 is substantially similar to reduced speckle screen 70 shown in FIG. 2, and components in reduced speckle screen 110 that are identical to components in reduced speckle screen 70 are identified in FIG. 3 using the same reference numerals used in FIG. 2. Accordingly, reduced speckle screen 110 includes a substrate 74 and a plurality of non-imaging optical concentrators 72 extending from substrate 74. A plurality of valleys 78 are interposed between concentrators 72. In an alternative embodiment, each valley 78 includes an aluminum layer and a light absorbing layer. Screen 110 further includes a plurality of diffusers 112 positioned at an audience side 114 of concentrators 72 such that each non-imaging concentrator 72 has a corresponding diffuser 112.

During operation of screen 110, light from a light engine (not shown in FIG. 3) enters screen 110 at light engine side 88 and passes through substrate 74 before entering concentrator 72. The light leaves concentrator 72 with an accumulated optical path difference between an on-axis path and an off-axis path, and passes through diffuser 112 before exiting audience side 86. Diffuser 112 redistributes the decorrelated light such that, at a plurality of viewer locations in an audience space, light is received from multiple paths through concentrator 72, which reduces speckle. More specifically, diffuser 112 causes an OPD inside a spatial coherence zone of the light that is greater than a coherence length of the light as the light leaves audience side 86 of screen 70 facilitating a reduction of speckle. Additionally, in one embodiment, the light exiting at least eighty percent of screen 110 from audience side 86 is at least two times the coherence length of the light. In an alternative embodiment, the light exiting at least ninety percent of screen 110 from audience side 86 is at least two times the coherence length of the light. In an exemplary embodiment, the light exiting approximately all of screen 110 from audience side 86 is at least two times the coherence length of the light.

Figure 5:
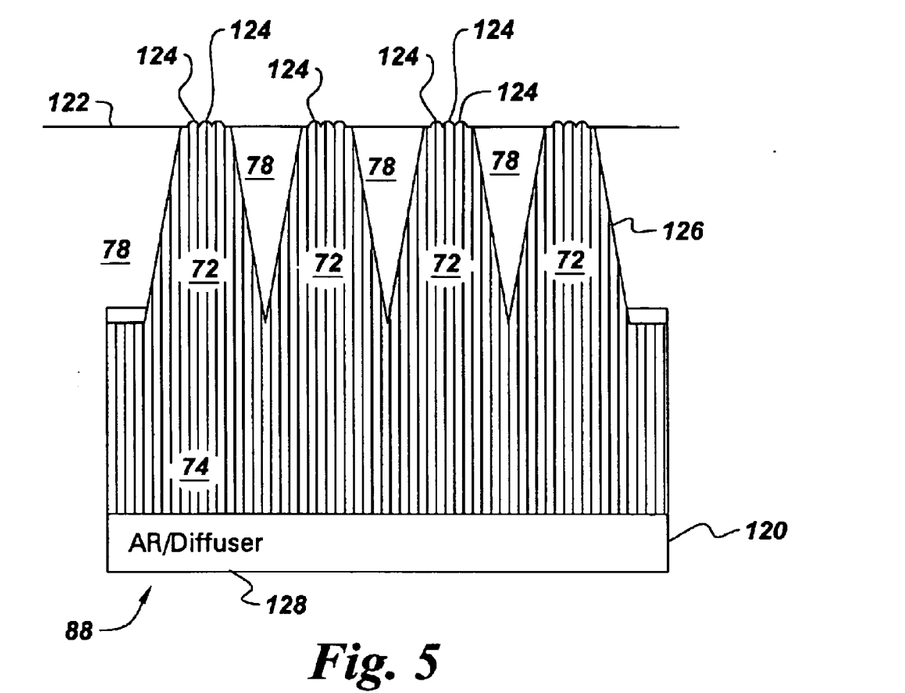
FIG. 5 is a cut away side view of an alternative embodiment of a reduced speckle screen.

FIG. 5 is a cut away side view of an alternative embodiment of a reduced speckle screen 120. Reduced speckle screen 120 is substantially similar to reduced speckle screen 110 shown in FIG. 4, and components in reduced speckle screen 120 that are identical to components in reduced speckle screen 110 are identified in FIG. 5 using the same reference numerals used in FIG. 4. Accordingly, reduced speckle screen 120 includes a substrate 74 and a plurality of non-imaging optical concentrators 72 extending from substrate 74. A plurality of valleys 78 are interposed between concentrators 72. Each valley 78 includes a reflective layer 80 covered by an absorbing layer. In one embodiment, a filler material is utilized to fill valleys 78 such that screen 120 includes a substantially planar top surface 122. Screen 120 further includes a microoptic top structure 124 positioned at an audience side 126 of concentrator 72. In one embodiment, microoptic top structure 124 includes microlenses. In another embodiment, microoptic top structure 124 forms a lenticular top structure. Screen 120 further includes a light engine diffuser 128 positioned at a light engine side 88.

During operation of screen 120, light from a light engine (not shown in FIG. 4) enters screen 120 at light engine side 88 and passes through light engine diffuser 128 and substrate 74 before entering concentrator 72. The light leaves concentrator 72 and passes through microoptic top structure 124 before exiting audience side 86. Microoptic top structure 124 in combination with concentrator 72 facilitates a reduction in speckle as explained above. Additionally, microoptic top structure 124 in combination with concentrator 72 and light engine diffuser 128 facilitates a reduction in speckle more than if diffuser 128 were not present in screen 120.

Figure 6:
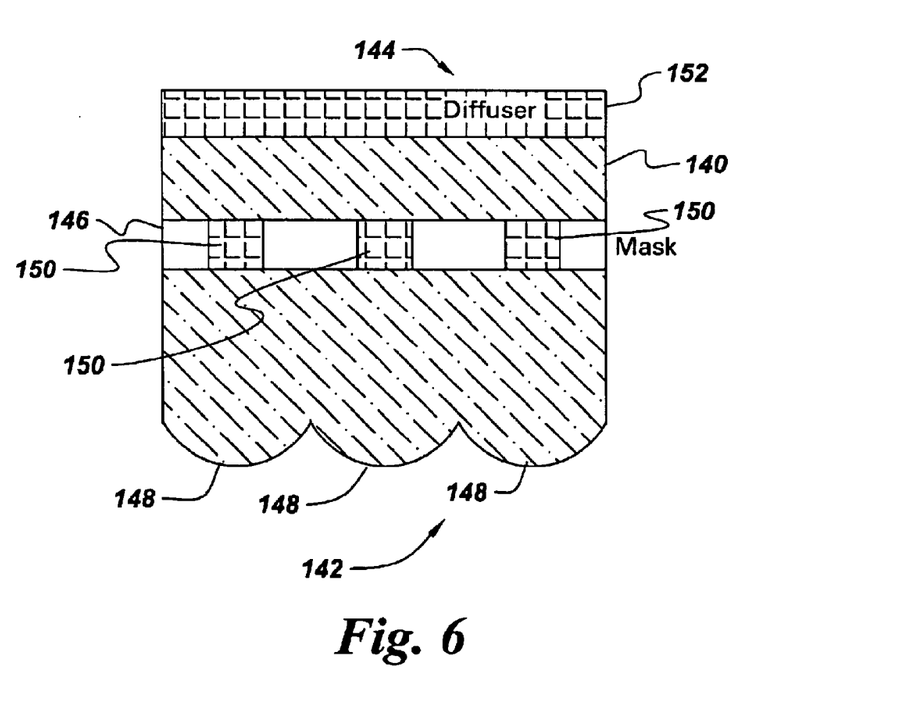
FIG. 6 is a cut away side view of an alternative embodiment of a reduced speckle screen.

FIG. 6 is a cut away side view of an alternative embodiment of a reduced speckle screen 140 including a light engine side 142, an audience side 144, and a mask 146 positioned between light engine side 142 and audience side 144. Light engine side 142 includes a plurality of microoptic structures 148. In one embodiment, microoptic structures 148 are microlenses. In another embodiment, microoptic structures 148 form a lenticular structure. Mask 146 includes a plurality of apertures 150. A diffuser 152 is positioned at audience side 144.

During operation of screen 140, light from a light engine (not shown in FIG. 6) enters microoptic structures 148 from light engine side 142. The light travels through screen 140 toward mask 146. While some of the light encounters mask 146 and is absorbed by mask 146, most of the light passes through apertures 150 and is diffused by diffuser 152 before exiting audience side 144. Microoptic structures 148 are locally inverting and are optical path distributing elements. Accordingly, microoptic structures 148 in combination with diffuser 152 facilitate a reduction in speckle.

FIG. 7 is a perspective view of a plurality of non-imaging concentrator elements 160 including an array 162 of ten by five degree trapezoid non-imaging elements 164, an array 166 of trapezoidal lenticular non-imaging elements 168, and a plurality of skew elements 170. Skew elements mean that the concentrators are less than completely rotationally symmetric and thus the light makes multiple bounces (reflections) around a perimeter of the element before exiting the element. These multiple bounces facilitate an increase in optical path difference. Additionally, positioning a diffuser such as diffuser 112 between the light engine and skew element 170 enhances the increase in OPD.

Figure 8:
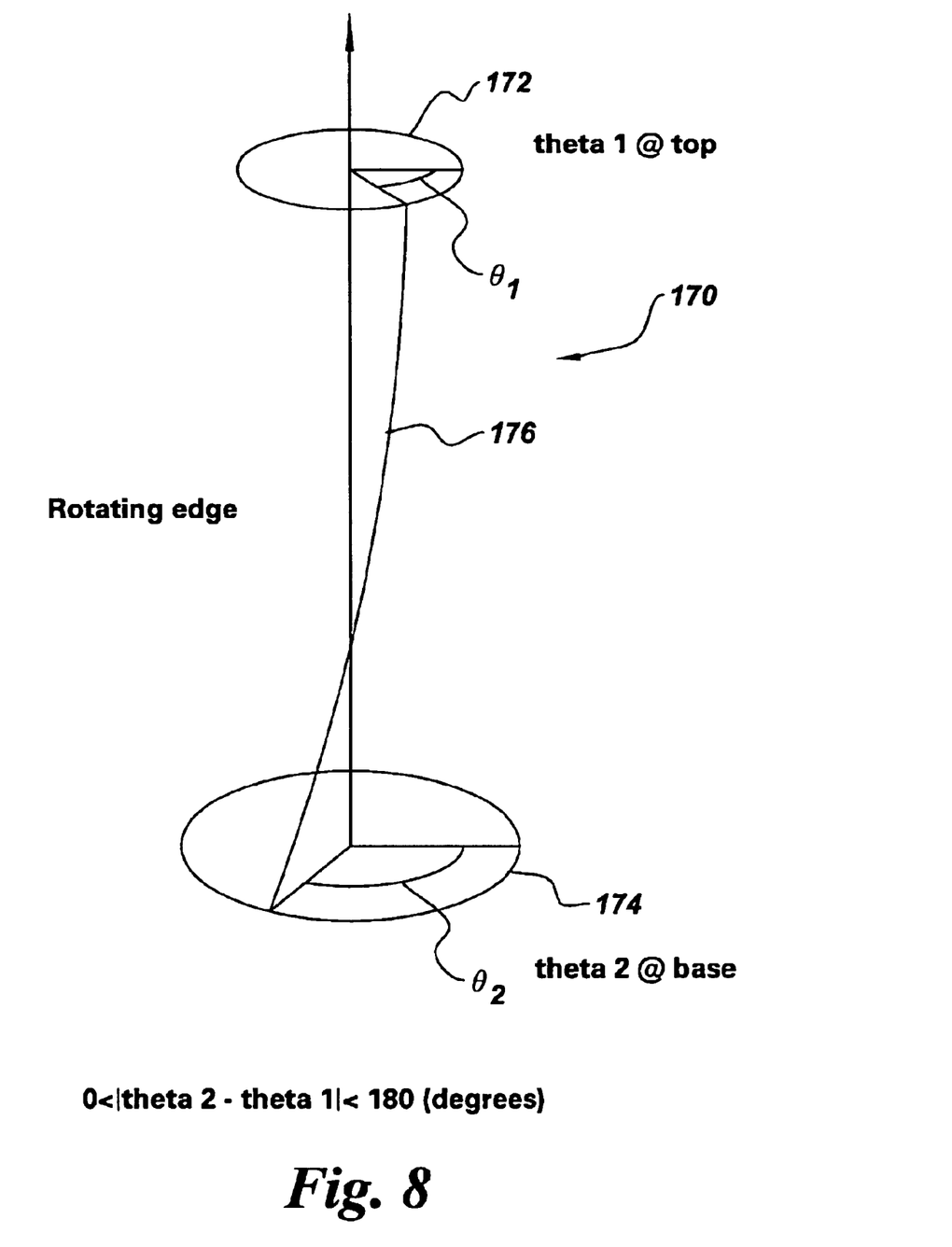
FIG. 8 illustrates a geometry for some of the skew elements shown in FIG. 7.

FIG. 8 illustrates a geometry for some of skew elements 170 (shown in FIG. 7). A first angle $\theta_1$ refers to a top 172 of skew element 170 and a second angle $\theta_2$ refers to a bottom 174 of skew element 170. In one embodiment, $\theta_1$ is less than $\theta_2$ and accordingly an edge 176 of skew element 170 rotates right-handedly as edge 176 traverses from bottom 174 to top 172. An absolute value of $\theta_1-\theta_2$ is less than 180°. In another embodiment, $\theta_2$ is less than $\theta_1$ and accordingly edge 176 rotates left-handedly as edge 176 traverses from bottom 174 to top 172.

Figure 9:
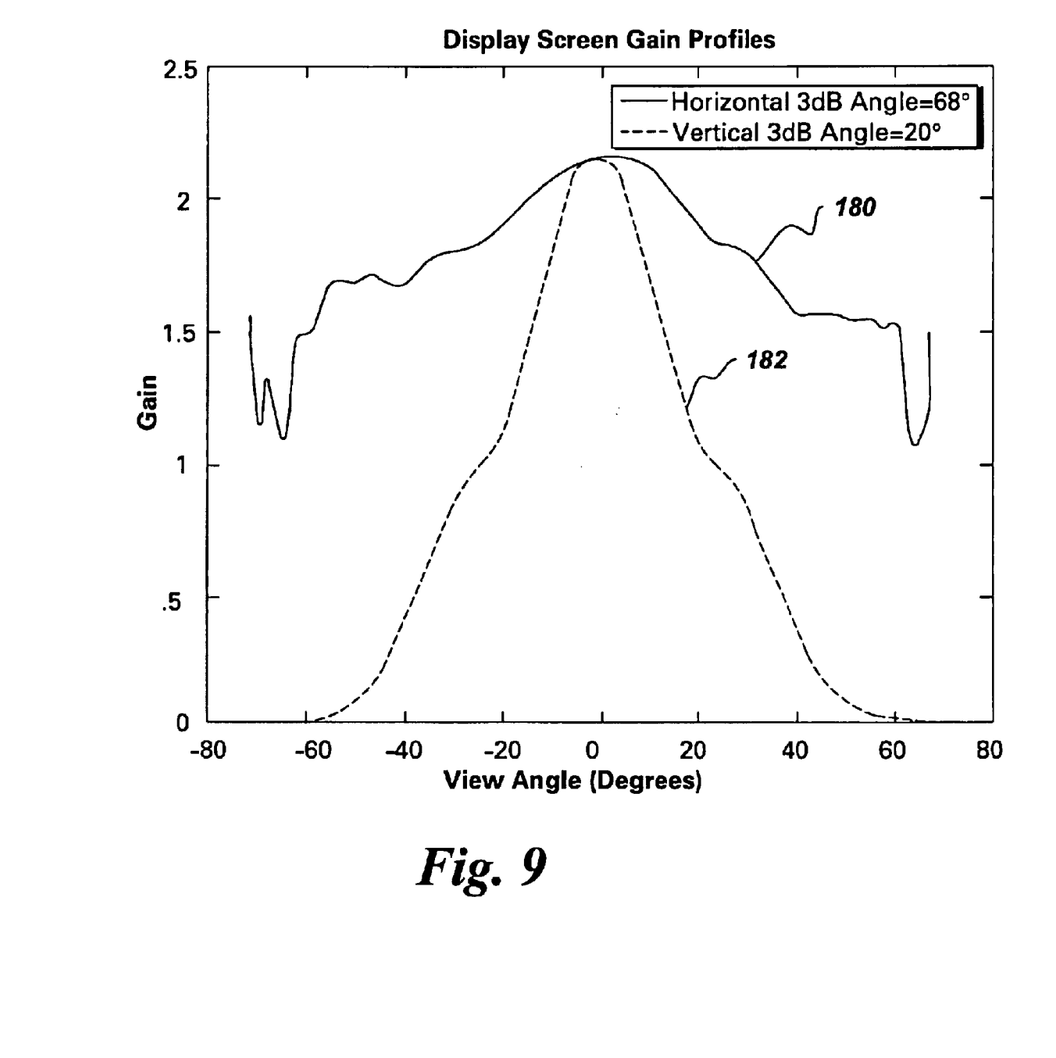
FIG. 9 is a gain profile for the ten by five degree trapezoid non-imaging element shown in FIG. 7.
Figure 10:
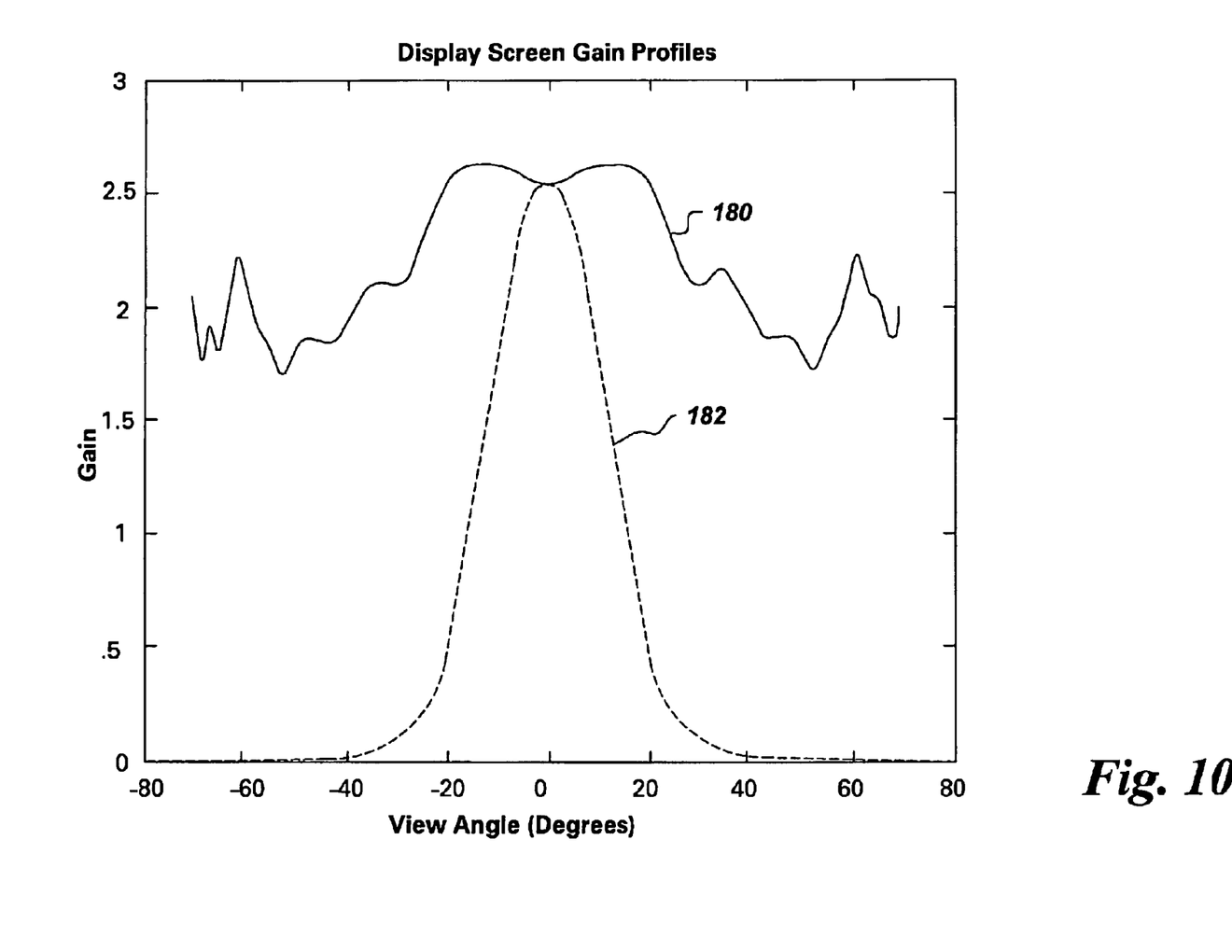
FIG. 10 is a gain profile for the trapezoidal lenticular non-imaging element shown in FIG. 7.
Figure 11:
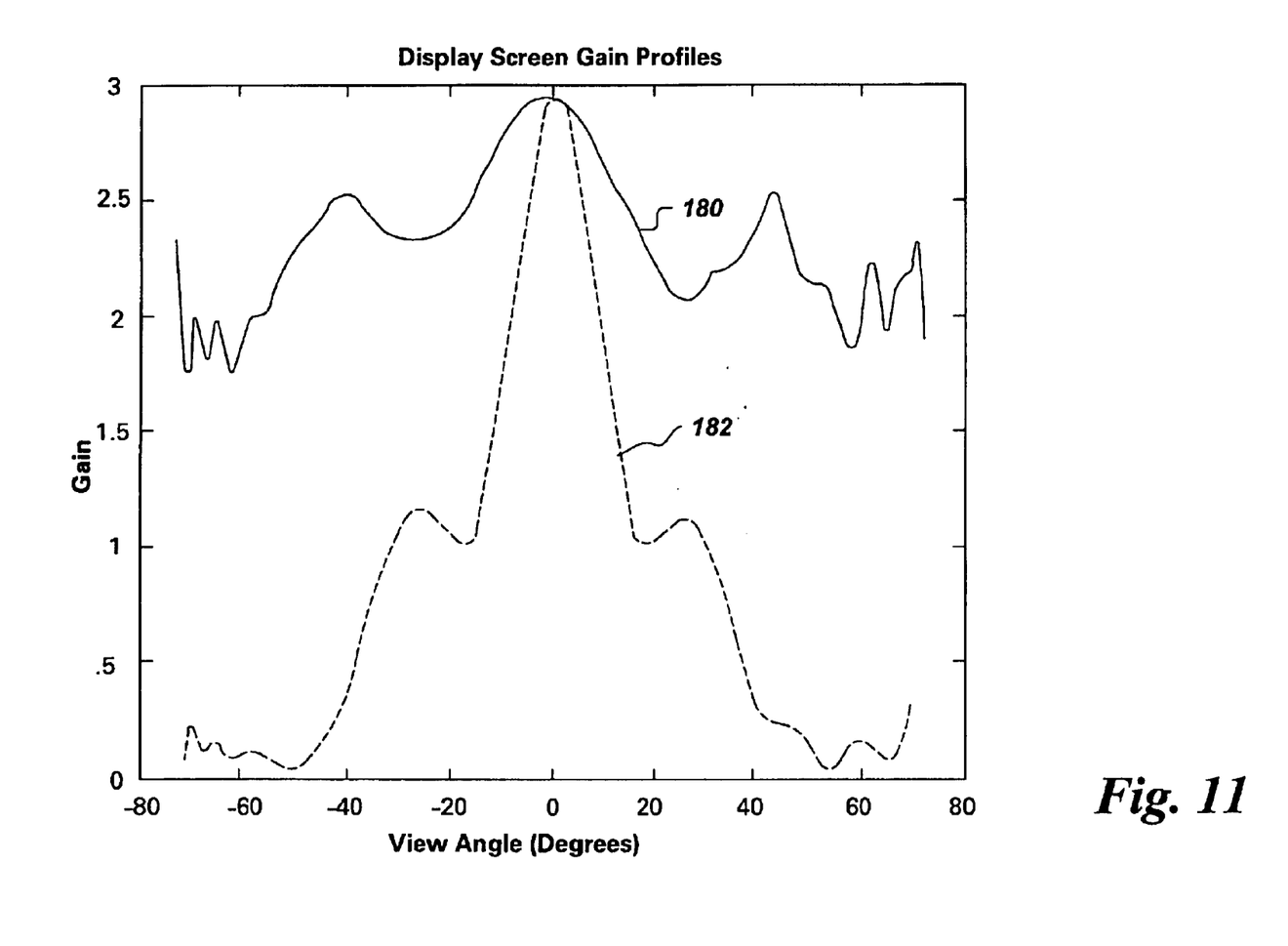
FIG. 11 is a gain profile for a nine by nine degree trapezoid non-imaging element.
Figure 12:
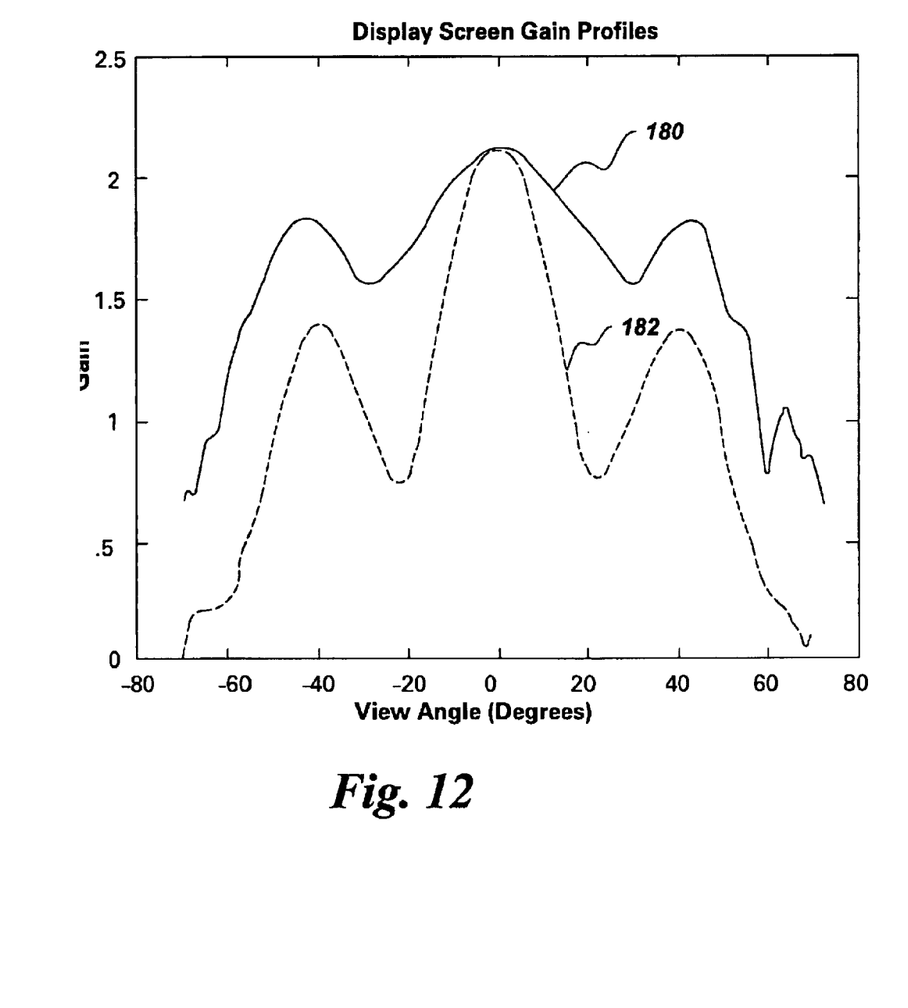
FIG. 12 is a gain profile for an eight degree hex non-imaging element.

FIG. 9 is a gain profile for ten by five degree trapezoid non-imaging element 164 (shown in FIG. 7). FIG. 10 is a gain profile for trapezoidal lenticular non-imaging element (shown in FIG. 7). FIG. 11 is a gain profile for a nine by nine degree trapezoid non-imaging element (not shown), and FIG. 12 is a gain profile for an eight degree hex non-imaging element (not shown). Each profile includes a horizontal gain profile 180 and a vertical gain profile 182. As illustrated in the gain profiles, ten by five degree trapezoid non-imaging element 164 produces a favorable gain over the widest range of viewing angles of the four profiles, with a horizontal three decibel angle of 68° and a vertical three decibel angle of 20°.

During operation of a screen, such as, for example, screens 70, 110, and 120, incorporating ten by five degree trapezoid non-imaging element 164 in combination with angular distribution element 58 (shown in FIG. 1) or diffuser 112 (shown in FIG. 2), a reduction in speckle is facilitated as explained above. Additionally, gain is favorable over a wide range of viewing angles as shown in FIG. 9.

Accordingly, a screen is provided that is cost-effective and facilitates a reduction in speckle while also delivering a high gain image over a wide range of viewing angles. The screen is economical to manufacture and, in one embodiment, the screen is of integral construction. In another embodiment, the screen is of unitary construction.

Figure 13:
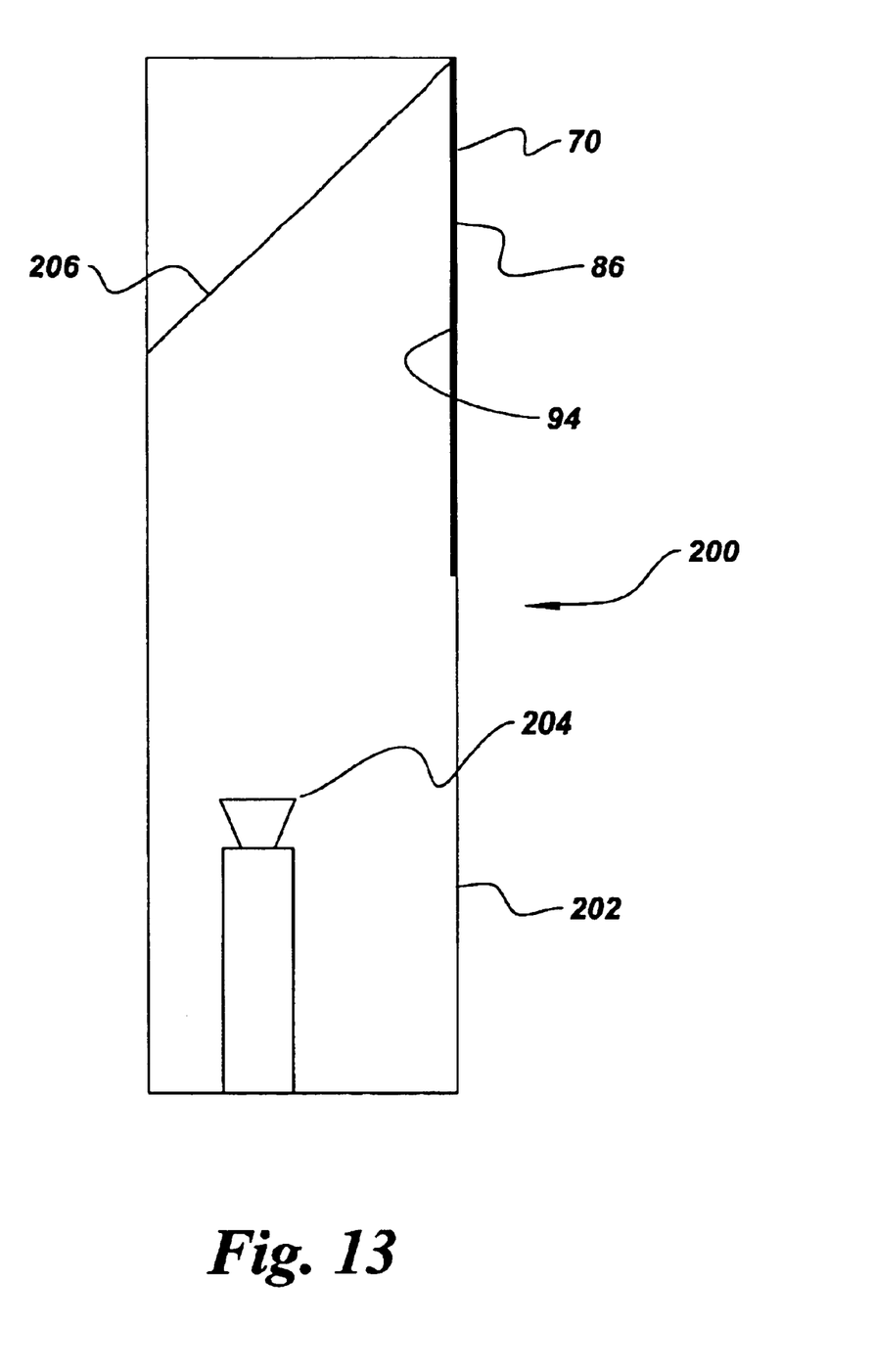
FIG. 13 is a side view with parts cut away of a rear projection speckle-reduced television set.

FIG. 13 is a side view with parts cut away of a rear projection speckle-reduced television set 200 including a housing 202 and a light valve or light engine 204 positioned within housing 202. Television set 200 further includes a reflection mirror 206 and reduced speckle screen 70 (shown in FIG. 2). In an alternative embodiment, television set 200 includes screen 110 (shown in FIG. 3) or screen 120 (shown in FIG. 5) instead of screen 70.

During operation of television set 200, light leaves light engine 204 and is reflected off reflection mirror 206 to light engine side 88 of screen 70. As explained above regarding FIG. 2, the light passes through substrate 74 before travelling through concentrator 72. The light passes through top portion 156 before being diffused by diffuser 90 and exiting audience side 86. As explained above, diffuser 90 in combination with concentrator 72 facilitates a reduction in speckle. More specifically, diffuser 90 causes an OPD inside a spatial coherence zone of light 92 that is greater than a coherence length of light 92 as light 92 leaves audience side 86 of screen 70 facilitating a reduction of speckle. In one embodiment, the distribution of optical paths i.e., OPD, is at least two times the coherence length of the light. In another embodiment, the distribution of optical paths is more than or less than two times the coherence length of the light.

Figure 14:
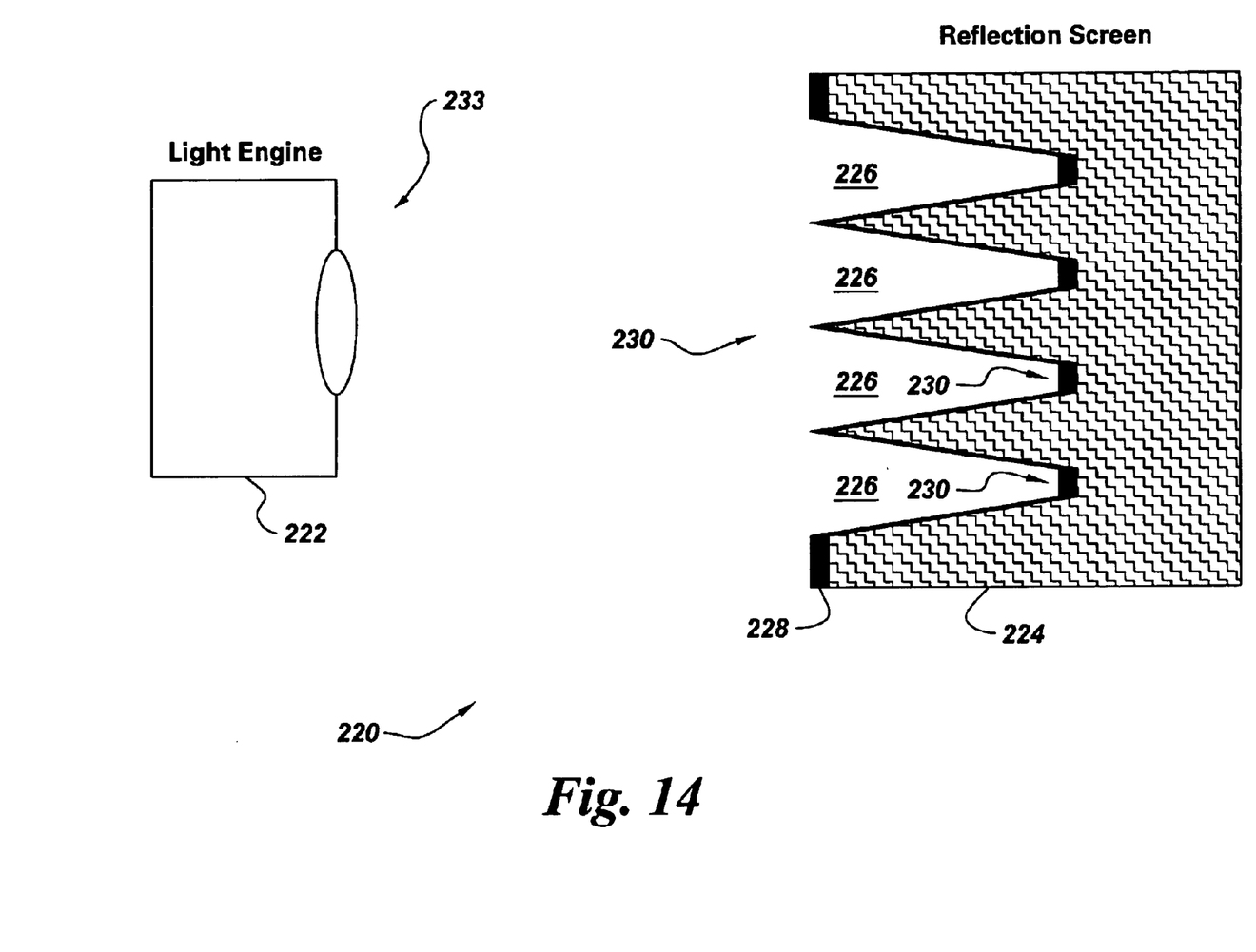
FIG. 14 is an embodiment of a front projection television system.

FIG. 14 is an embodiment of a front projection television system 220 including a light engine 222 and a reflection screen 224. Light engine 222 is positioned in an audience space 223 including a plurality of viewer locations (not shown). Reflection screen 224 includes a plurality of divots 226 shaped identical to concentrator element 96 (shown in FIG. 4). In one embodiment, divots 226 are voids. In another embodiment, divots 226 are fabricated from an optical conductor with an index of refraction between about 1.1 and about 3. Screen 224 further includes a reflective coating 228 on a light engine side 230.

In one embodiment, reflective coating 228 is a diffusing reflective coating. Light from light engine 222 enters divots 226 from light engine side 230 and reflects off coating 228 returning toward light engine 222. More particularly, at least some of the light entering divots 226 make multiple reflections off coating 228 which causes an optical path difference between an on-axis path and an off-axis path of the light to accumulate before the light returns toward audience space 223. Additionally, the multiple reflections of the light off of diffusing reflective surface 228 distributes the decorrelated light to audience space 223 such that at each viewer location light is received from multiple paths through divots 226, which facilitates a reduction in speckle.

While the invention has been described in terms of various specific embodiments, those skilled in the art will recognize that the invention can be practiced with modification within the spirit and scope of the claims.

What is claimed is:

1. A method for facilitating a reduction of speckle in a screen receiving light from a light source, said method comprising the steps of:
    positioning at least one optical path distributing screen element such that the light originating from the light source passes through the screen element shaped such that a distribution of optical paths of light exiting the screen is at least two times a coherence length of the light and emerges decorrelated from the screen element toward an audience space; and
    positioning an angular distribution element between the screen element and the audience space such that the angular distribution element distributes the decorrelated light from the screen element toward the audience space.

2. A method according to claim 1 wherein said step of positioning at least one optical path distributing element comprises the step of positioning at least one non-imaging optical path distributing screen element.

3. A method according to claim 1 wherein said step of positioning at least one optical path distributing element comprises the step of positioning at least one non-imaging optical path distributing screen element comprising at least one non-imaging optical concentrator.

4. A method according to claim 3 wherein said step of positioning at least one non-imaging optical path distributing element comprises the step of positioning at least one of a non-imaging trapezoid concentrator and a non-imaging skew concentrator.

5. A method according to claim 3 wherein said step of positioning at least one non-imaging optical path distributing element comprises the step of positioning at least one ten by five degree trapezoid concentrator.

6. A method according to claim 3 wherein said step of positioning at least one non-imaging optical path distributing element comprises the step of positioning at least one ten by five degree trapezoid concentrator comprising one of a polycarbonate, a polymethylmethacrylate, a polyester, a poly(4-methyl pentene) polystyrene, a polymer formed by photopolymerization of an acrylate monomer(s), and mixtures thereof.

7. A method according to claim 6 wherein said step of positioning at least one non-imaging optical path distributing element comprises the step of positioning at least one ten by five degree trapezoid concentrator comprising a polycarbonate having an index of refraction greater than about 1.40 and less than about 1.65.

8. A method according to claim 6 wherein said step of positioning at least one non-imaging optical path distributing element comprises the step of positioning at least one ten by five degree trapezoid concentrator comprising a polycarbonate having an index of refraction greater than about 1.50 and less than about 1.60.

9. A method according to claim 6 wherein said step of positioning at least one non-imaging optical path distributing element comprises the step of positioning at least one ten by five degree trapezoid concentrator comprising a polycarbonate having an index of refraction greater than about 1.55 and less than about 1.60.

10. A method according to claim 3 wherein said step of positioning at least one non-imaging optical path distributing element comprises the step of positioning at least one ten by five degree trapezoid concentrator having an index of refraction greater than about 1.1 and less than about 3.

11. A method according to claim 1 further comprising the step of attaching a field lens to the optical path distributing screen element and the angular distribution element to form an integral body.

12. A method according to claim 11 wherein said step of attaching a field lens comprises the step of attaching at least one of a holographic field lens and a Fresnel field lens.

13. A method according to claim 1 further comprising the step of forming a unitary body with the optical path distributing screen element and the angular distribution element.

14. A method according to claim 1 wherein said step of positioning an angular distribution element further comprises the step of positioning an angular distribution element comprising a diffuser to distribute the decorrelated light from the screen element.

15. A method according to claim 1 wherein said step of positioning at least one optical path distributing screen element further comprises the step of positioning at least one imaging optical path distributing element having an exit angle between twenty-five percent and two-hundred percent of a diffusion angle of the angular distribution element.

16. A method according to claim 1 wherein said step of positioning at least one optical path distributing screen element further comprises the step of positioning at least one imaging optical path distributing element having an exit angle, said step of positioning an angular distribution element further comprises the step of positioning an angular distribution element having a diffusion angle substantially equal to the exit angle between the screen element and the audience space such that the angular distribution element distributes the decorrelated light from the screen element.

17. A method according to claim 1 wherein said step of positioning at least one optical path distributing element further comprises the step of positioning at least one optical path distributing element including a reflecting layer.

18. A method according to claim 1 wherein said step of positioning at least one optical path distributing element further comprises the step of positioning at least one optical path distributing element including an absorbing layer.

19. A method according to claim 1 wherein said step of positioning at least one optical path distributing element further comprises the step of positioning at least one optical path distributing element including a reflecting layer and an absorbing layer such that the absorbing layer is between the reflecting layer and the audience space.

20. A method according to claim 1 wherein said step of positioning at least one optical path distributing element further comprises the step of positioning at least one optical path distributing element including a reflecting layer including a bulk absorber.

21. A method according to claim 1 wherein said step of position at least one optical path distributing element comprises the steps of positioning at least one imaging optical path distributing screen element.

22. A method for facilitating a reduction of speckle in a projection television screen, said method comprising the steps of:
providing a plurality of optical path distributing screen elements each including a light-incidence light engine side and a light-emergence audience side, the screen elements shaped such that a distribution of optical paths of light exiting at least eighty percent of the screen elements from the audience side is at least two times the coherence length of the light; and
positioning a plurality of diffuser elements between the screen elements and an audience space such that the diffuser elements distribute decorrelated light emerging from the screen elements toward an audience space.

23. A method according to claim 22 wherein said step of providing comprises the step of providing a plurality of non-imaging optical path distributing screen elements each including a light-incidence light engine side and a light-emergence audience side, the screen elements shaped such that a distribution of optical paths of light exiting at least ninety percent of the screen elements from the audience side is at least two times the coherence length of the light.

24. A method according to claim 22 wherein said step of providing comprises the step of providing a plurality of non-imaging optical path distributing screen elements each including a light-incidence light engine side and a light-emergence audience side, the screen elements shaped such that a distribution of optical paths of light exiting substantially all of the screen elements from the audience side is at least two times the coherence length of the light.

25. A method according to claim 22 wherein said step of providing comprises the step of providing a plurality of imaging optical path distributing screen elements each including a light-incidence light engine side and a light-emergence audience side, the screen elements shaped such that a distribution of optical paths of light exiting at least ninety percent of the screen elements from the audience side is at least two times the coherence length of the light.

26. A method according to claim 22 wherein said step of providing further comprises the step of providing a plurality of imaging optical path distributing screen elements each including a light-incidence light engine side and a light-emergence audience side, the screen elements shaped such that a distribution of optical paths of light exiting substantially all of the screen elements from the audience side is at least two times the coherence length of the light.

27. A rear projection television comprising:
a housing;
a light engine positioned in said housing; and
a screen positioned between said light engine and an audience space, said screen mounted to said housing and comprising:
a field lens;
at least one optical path distributing screen element operationally coupled to said field lens; and
at least one angular distribution element operationally coupled to said non-imaging optical screen element shaped such that a distribution of optical paths of light exiting said screen is at least two times a coherence length of the light and positioned such that said angular distribution element distributes a decorrelated light emerging from said screen element toward the audience space.

28. A rear projection television according to claim 27 wherein said optical path distributing screen element comprises at least one non-imaging optical path distributing element.

29. A rear projection television according to claim 28 wherein said non-imaging optical concentrator comprises at least one of a non-imaging trapezoid concentrator and a skew concentrator.

30. A rear projection television according to claim 28 wherein said non-imaging optical concentrator comprises at least one substantially ten by five degree trapezoid concentrator.

31. A rear projection television according to claim 28 wherein said non-imaging optical concentrator comprises at least one substantially ten by five degree trapezoid concentrator comprising one of a polycarbonate, a polymethylmethylate, a polyester, a poly(4-methyl pentene) polystyrene, a polymer formed by photopolymerization of an acrylate monomer(s), and mixtures thereof.

32. A rear projection television according to claim 31 wherein said non-imaging optical concentrator comprises a polycarbonate having an index of refraction greater than about 1.40 and less than 1.65.

33. A rear projection television according to claim 31 wherein said non-imaging optical concentrator comprises a polycarbonate having an index of refraction greater than about 1.50 and less than 1.60.

34. A rear projection television according to claim 31 wherein said non-imaging optical concentrator comprises a polycarbonate having an index of refraction greater than about 1.55 and less than 1.60.

35. A rear projection television according to claim 31 wherein said non-imaging optical path distributing element operationally coupled to said angular distribution element forming an integral body.

36. A rear projection television according to claim 28 wherein said non-imaging optical concentrator comprises at least one substantially ten by five degree trapezoid concentrator having an index of refraction greater than about 1.1 and less than 3.0.

37. A rear projection television according to claim 27 wherein said non-imaging element operationally coupled to said angular distribution element forming a unitary body.

38. A rear projection television according to claim 27 wherein said angular distribution element comprises a diffuser.

39. A rear projection television according to claim 27 wherein said optical path distributing screen element comprises at least one imaging optical path distributing element.

40. A rear projection television according to claim 27 wherein said optical path distributing element comprises a reflecting layer.

41. A rear projection television according to claim 27 wherein said optical path distributing element comprises an absorbing layer.

42. A rear projection television according to claim 27 wherein said optical distributing element comprises a reflecting layer and an absorbing layer such that said absorbing layer is between said reflecting layer and the audience space.

43. A rear projection television according to claim 27 wherein said optical path distributing element comprises a reflecting layer comprising a bulk absorber.

44. A unitary screen for a rear projection television, said screen comprising:
a light engine side comprising at least one non-imaging optical screen element comprising a substantially ten by five degree trapezoid concentrator comprising a polycarbonate having an index of refraction of about 1.59; and
an audience side comprising at least one diffuser element positioned such that said angular distribution element distributes decorrelated light emerging from said screen element toward an audience space, said trapezoid concentrator shaped such that a distribution of optical paths of light exiting said screen is at least two times a coherence length of the light.

45. A screen for a rear projection television, said screen comprising:
a light engine side comprising at least one optical path distributing screen element shaped such that a distribution of optical paths of light exiting said screen is at least two times a coherence length of the light; and
an audience side comprising at least one angular distribution element positioned such that said angular distribution element distributes decorrelated light emerging from said screen element toward an audience space.

46. A screen according to claim 45 wherein said optical path distributing element comprises a non-imaging element.

47. A screen according to claim 45 wherein said optical path distributing element comprises at least one non-imaging optical concentrator.

48. A screen according to claim 47 wherein said non-imaging optical concentrator comprises at least one of a non-imaging trapezoid concentrator and a non-imaging skew concentrator.

49. A screen according to claim 47 wherein said non-imaging optical concentrator comprises at least one ten by five degree trapezoid concentrator.

50. A screen according to claim 47 wherein said non-imaging optical concentrator comprises at least one ten by five degree trapezoid concentrator comprising one of a polycarbonate, a polymethylmethacrylate, a polyester, a poly(4-methyl pentene)polystyrene, a polymer formed by photopolymerization of an acrylate monomer(s), and mixtures thereof.

51. A screen according to claim 47 wherein said non-imaging optical concentrator comprises at least one ten by five degree trapezoid concentrator having an index of refraction greater than about 1.1 and less than about 3.0.

52. A screen according to claim 50 wherein said ten by five degree trapezoid concentrator comprises a polycarbonate having an index of refraction greater than about 1.4 and less than 1.65.

53. A screen according to claim 50 wherein said ten by five degree trapezoid concentrator comprises a polycarbonate having an index of refraction greater than about 1.50 and less than 1.60.

54. A screen according to claim 50 wherein said ten by five degree trapezoid concentrator comprises a polycarbonate having an index of refraction greater than about 1.55 and less than 1.60.

55. A screen according to claim 47 wherein said non-imaging optical concentrator operationally coupled to said angular distribution element forming an integral screen.

56. A screen according to claim 47 wherein said non-imaging optical concentrator operationally coupled to said angular distribution element forming a unitary screen.

57. A screen according to claim 45 wherein said angular distribution element comprises a diffuser.

58. A screen according to claim 45 wherein said optical path distributing element comprises an imaging element.

59. A screen according to claim 45 wherein said optical path distributing element comprises a reflecting layer.

60. A screen according to claim 45 wherein said optical path distributing element comprises an absorbing layer.

61. A screen according to claim 45 wherein said optical path distributing element comprises a reflecting layer and an absorbing layer such that said absorbing layer is between said reflecting layer and the audience space.

62. A screen according to claim 45 wherein said optical path distributing element comprises a reflecting layer comprising a bulk absorber.

* * * * *